July 27, 1965 W. T. CHAMPION 3,196,561
RUBBER HEEL HAVING A REAR IMPACT SECTION
AND A COLLAPSIBLE SKIRT-LIKE PORTION
Filed Jan. 3, 1963 4 Sheets-Sheet 1
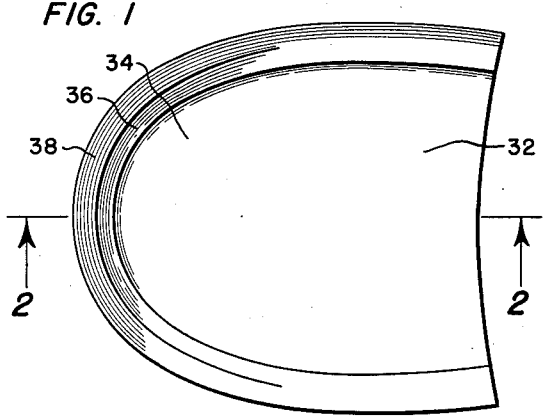
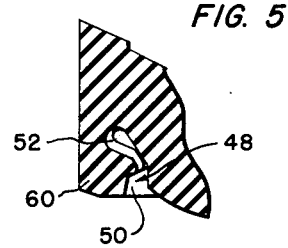
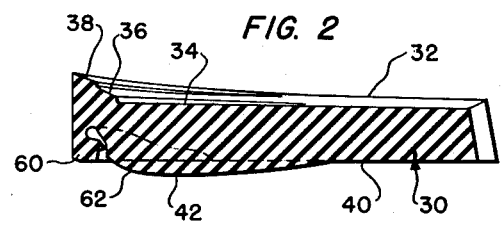
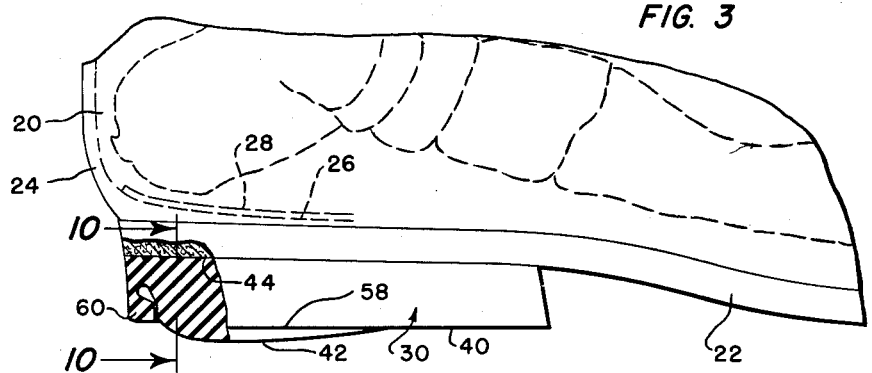
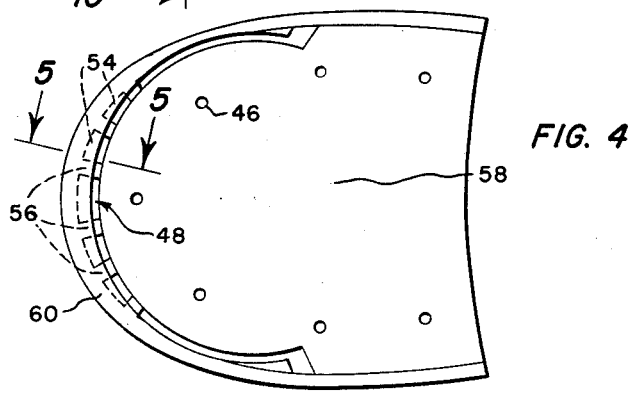
INVENTOR.
WILLIAM T. CHAMPION
ATTORNEY July 27, 1965
W. T. CHAMPION
3,196,561
RUBBER HEEL HAVING A REAR IMPACT SECTION
AND A COLLAPSIBLE SKIRT-LIKE PORTION
Filed Jan. 3, 1963
4 Sheets-Sheet 2
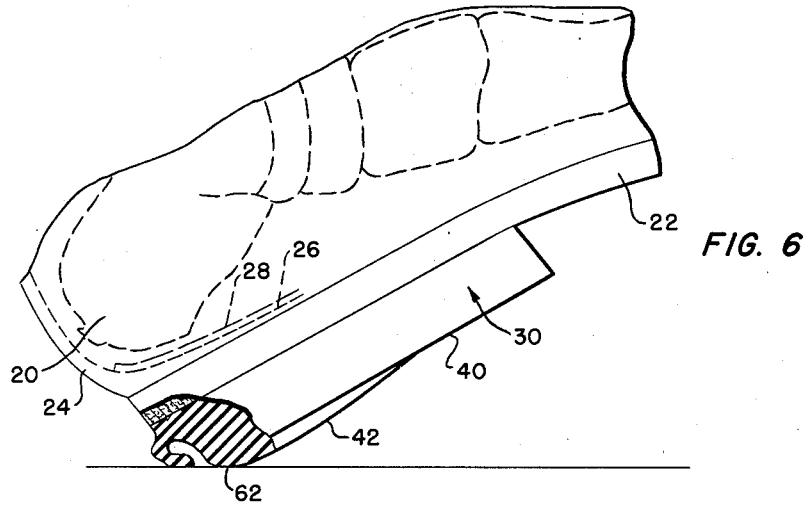
FIG. 6
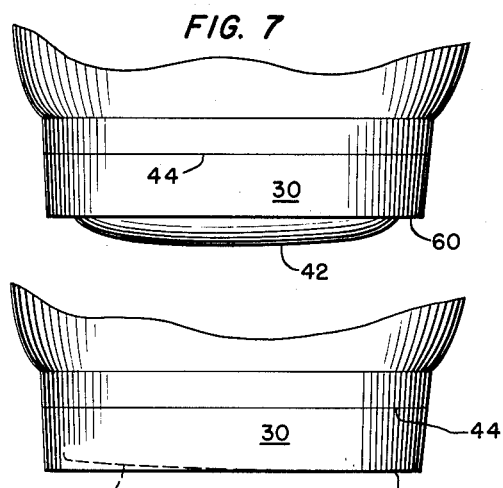
FIG. 7
FIG. 8
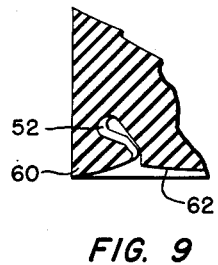
FIG. 9
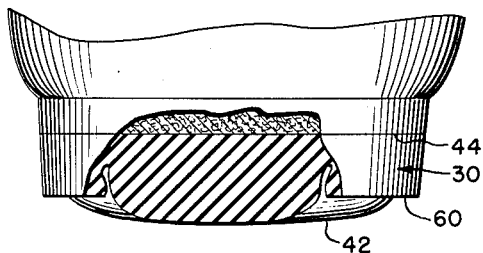
FIG. 10
INVENTOR.
WILLIAM T. CHAMPION
BY Fulwider, Mattingly &
Huntley
ATTORNEY July 27, 1965 W. T. CHAMPION 3,196,561
RUBBER HEEL HAVING A REAR IMPACT SECTION
AND A COLLAPSIBLE SKIRT-LIKE PORTION
Filed Jan. 3, 1963 4 Sheets-Sheet 3

INVENTOR.
WILLIAM T. CHAMPION
BY
ATTORNEYS

July 27, 1965

W. T. CHAMPION 3,196,561

RUBBER HEEL HAVING A REAR IMPACT SECTION
AND A COLLAPSIBLE SKIRT-LIKE PORTION

Filed Jan. 3, 1963

INVENTOR.
WILLIAM T. CHAMPION

BY *Fulwider, Mattingly*
*& Huntley*

ATTORNEYS

# United States Patent Office 3,196,561
Patented July 27, 1965

3,196,561
RUBBER HEEL HAVING A REAR IMPACT SECTION AND A COLLAPSIBLE SKIRT-LIKE PORTION
William T. Champion, 2333 Presidio Drive, San Diego, Calif.
Filed Jan. 3, 1963, Ser. No. 249,571
9 Claims. (Cl. 36—35)

The present invention relates to a resilient heel, such as a rubber heel, for a shoe.

The present application is a continuation-in-part of my co-pending application, Serial No. 132,733 filed Aug. 21, 1961, now abandoned.

The resilient heel of the present invention includes a weight bearing portion throughout the front portion thereof, an impact receiving section disposed forwardly of the rear of the heel, and includes a downwardly extending and outwardly flexible and collapsible skirt-like portion, which skirt-like portion is disposed rearwardly and outwardly of the impact section throughout at least the margin of the rear and an immediate part of one side of said rear of the impact section, and is preferably disposed outwardly throughout the margin of the rear and the opposite sides of the rear of the impact section.

The skirt is formed integrally with the weight bearing portion in the preferred embodiment of the invention, and, in one embodiment, a plurality of webs interconnect the skirt and the weight bearing portion.

Preferably the upper portion of the skirt is narrower than the lower portion thereof, or, stated differently, the skirt is thicker at the bottom than at the top.

In the preferred embodiment, that portion of the underside of the heel immediately forward and inwardly of the skirt-like portion is elevated above the lower edge of the skirt-like portion when the heel is attached to the shoe. Also in the preferred embodiment, the area adjacent the opposite margins of the forward portion of the heel incline inwardly from the marginal edges when the heel is attached to the shoe to form a weight bearing portion removed from the side edges at the front of the heel.

Other features and the advantages will be apparent from the following description, references being had to the accompanying drawings wherein various embodiments of the invention are illustrated.

In the drawings:

FIG. 1 is a top plan view of the improved heel;

FIG. 2 is a fragmentary sectional view taken along line 2—2 of FIG. 1;

FIG. 3 is a fragmentary side view of the rear portion of a shoe showing the improved heel attached under part of the heel being shown in section, the section being taken along line 2—2 of FIG. 1;

FIG. 4 is a bottom plan view of the heel;

FIG. 5 is a fragmentary sectional view of the heel, similar to FIG. 2 but on an enlarged scale;

FIG. 6 is a view similar to FIG. 3, but showing the contour of the heel just after the person's foot, who is walking, contacting the walking surface;

FIG. 7 is a rear view of the shoe shown in FIG. 3 before any wear has taken place on the heel;

FIG. 8 is a view similar to FIG. 7 but showing in dotted lines the under surface of the heel after wear has taken place;

FIG. 9 is a fragmentary view in section showing the heel after being worn;

FIG. 10 is a sectional view taken along line 10—10 of FIG. 3, but turned ninety degrees;

Figure 11:
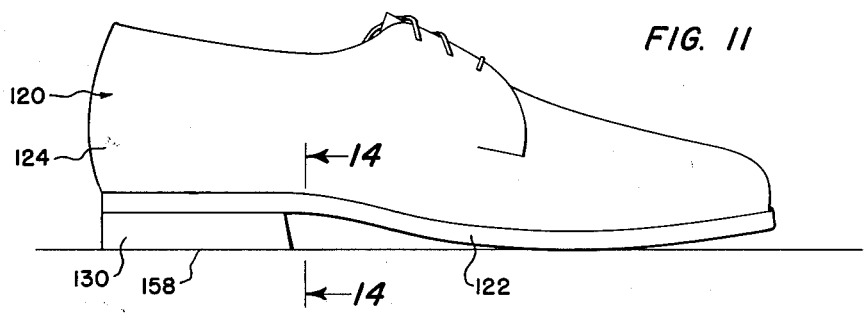
FIG. 11 is a side view of a shoe embodying a heel of another aspect of the invention.

Referring more in detail to FIGS. 1 to 10 of the drawings, the rear portion of a shoe is shown at 20, having an outsole 22, a counter 24, an insole 26, a heelpad 28 and a heel 30. The shoe so far described is that of a man's shoe and is of standard construction, except for the improved heel. The shoe shown is known in the trade as size nine and the heel shown is standard for that size shoe.

The rear margin of the heel like that of a standard heel is arcuate in shape as shown. The upper surface 32 of the heel 30, before being attached to the shoe, is concave, as is more clearly shown in FIG. 2. In accordance with the present invention this concave is formed in three separate steps at the rear thereof, as shown as 34, 36 and 38. The bottom surface 40 of the heel is convexed, as shown in FIGS. 2, 3 and 10. After the heel is attached to the shoe the entire upper surface, including surfaces 34, 36 and 38 are flattened and lie parallelly with the underside 44 of the heel section of the outsole 22. When the heel 30 is attached to the underside 44 of the heel section of the outsole 22, as for example by nails driven through the holes 46 in the heel, the convex undersurface 42 is substantially maintained as is more clearly shown in FIG. 3.

The heel is recessed from the bottom upwardly and preferably also outwardly throughout the portions adjacent the rear of the heel and at least one side of the heel immediately adjacent said rear, and, preferably the recess extends to both sides of the heel immediately adjacent the rear, as is more clearly shown in FIG. 4. This recess is generally shown at 48 and includes an uninterrupted recess section 50 at the lower end and throughout the entire length of the recess, and, also includes a section 52 which extends upwardly and outwardly from the section 50, which section 52 is divided, into a plurality of sub-sections 54 by a plurality of webs 56, as is more clearly shown in FIGS. 4 and 5. The sub-sections 54 of the recess increases in width upwardly and rearwardly to form upwardly and rearwardly increasing size gaps. Thus the recess 48 divides the heel 30 into an arcuately shaped, impact section 62 and a skirt 60 which latter extends about the rear of the impact section and along part of the sides of the impact section.

While walking normally the rear of the heel strikes the ground at an angle of approximately thirty degrees, as shown in FIG. 6. The skirt 60, being resilient functions as a bumper just prior to the time that the impact section 62 strikes the ground. The skirt-like portion 60, being thin at the top, will flex outwardly and will collapse upwardly upon impact with the walking surface, as is shown in FIG. 6. But this function is of very short duration and occurs approximately at the same time that the rear of the impact section strikes the ground.

A salient feature of the present invention resides in the fact that the impact receiving section 62 of the shoe heel lies forwardly of the rear of the heel of the foot of the wearer, approximately directly below the lower apex of the calcaneum bone of the foot of the wearer. Since the width of the skirt permits upward collapsing thereof, the impact of the foot on the walking surface, while wearing the shoe, will simulate natural impact, namely that of walking barefooted, yet providing a resilient cushion between the calcaneum bone and walking surface through the resiliency of the weight bearing portion heel of the shoe.

In normal walking, there is a slight sliding motion forwardly as the heel strikes the ground, immediately after the skirt functions as a bumper, the skirt being flexible, will collapse downwardly and will remain stationary while the rest of the heel slides forwardly, as is more clearly shown in FIG. 6. If flexible webs are provided, the extent of separation of the weight bearing portion and the skirt is limited by these flexible webs 56 which integrally interconnect the skirt and impact section. Although the skirt portion functions as a bumper, there is practically no wearing on exterior of this skirt portion; some wearing takes place outwardly of the recessed section 50, as shown in FIG. 9.

The sliding function on the ground causes a wearing of the impact section and the weight bearing portion. An example of the wearing is clearly shown by the dotted line in FIG. 8, yet, by virtue of the present invention, the outer surface of the skirt 60, for all practical purposes, is not worn, and consequently the outer appearance of the heel remains substantial, and in most circumstances, the same. Therefore, the skirt functions as a shroud for hiding the worn-away impact bearing portion.

Referring more in detail to the aspect of the invention shown in FIGS. 11 to 17, the shoe is shown at 120, having an outsole 122, a counter 124, an insole 126, a heel base 127 and a heel 130. The shoe so far described is that of a man's shoe and is of standard construction, except for the improved heel.

The margin of the rear of the heel 130, like that of a standard heel, is arcuate in shape as shown. The upper surface 132 of the heel 130, before being attached to the shoe, is concave, as is more clearly shown in FIGS. 15 and 13.

Figure 12:
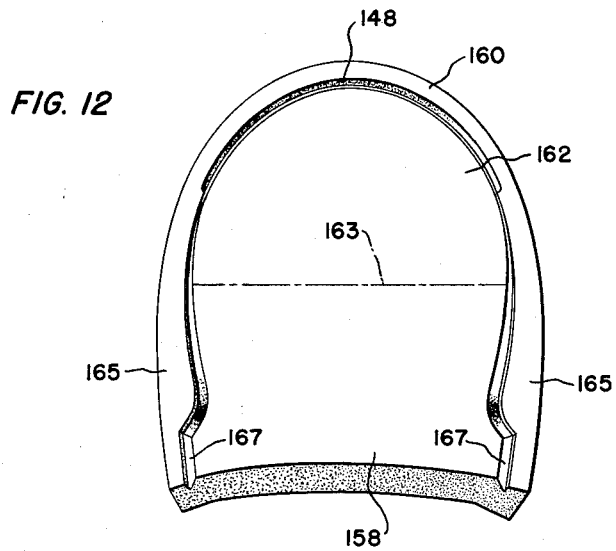
FIG. 12 is a perpsective bottom view of the heel shown in FIG. 11, but on a larger scale.

Heel 130 is recessed from the bottom upwardly and preferably also outwardly throughout the portions adjacent the rear of the heel and at least one side of the heel immediately adjacent said rear, and preferably the recess extends to both sides of the heel immediately adjacent the rear as is more clearly shown in FIG. 12. This recess is generally shown at 148 and includes an uninterrupted recess section 150 at the lower end and throughout the entire length of the recess, and, also includes a section 152 which extends upwardly and outwardly from the section 150. Thus this recess divides the heel 130 into an impact bearing section 162 and a skirt 160 which latter extends about the rear of the impact section and along part of the sides of said impact section.

As explained with respect to FIG. 6, the skirt 160, being resilient, functions as a bumper just prior to the time that the impact section 162 strikes the ground. Like in the embodiment shown in FIGS. 1 to 10, the skirt-like portion 160, being thin at the top, will flex outwardly and will collapse downwardly upon impact with the walking surface, in the same manner as shown in FIG. 6. But this function is of very short duration and occurs approximately at the same time that the rear of the impact section strikes the ground.

The weight bearing portion of the heel 130 is shown at 158. This weight bearing portion lies forwardly of the impact section 162 and lies parallelly with the ground surface when the shoe rests normally upon said ground surface. This weight bearing portion terminates at the rear in a substantially stright line at approximately right angles to the longitudinal extension of the shoe approximately along the line 163. The impact section extends from said line and slopes upwardly rearwardly as is more clearly shown in FIG. 16.

Figure 14:
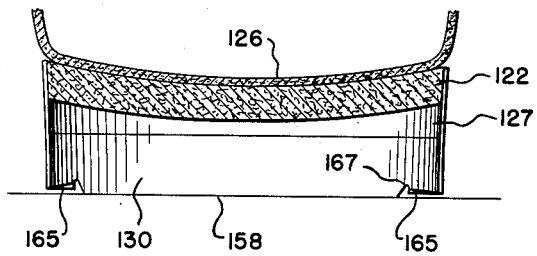
FIG. 14 is a fragmentary view of the shoe shown in FIG. 11, the section being taken along line 14—14 of FIG. 11 but on a larger scale.
Figure 15:
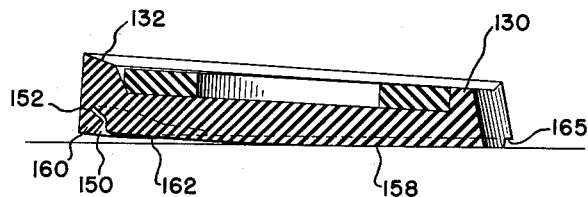
FIG. 15 is a cross section taken along line 15—15 of FIG. 13 showing the heel per se.
Figure 16:
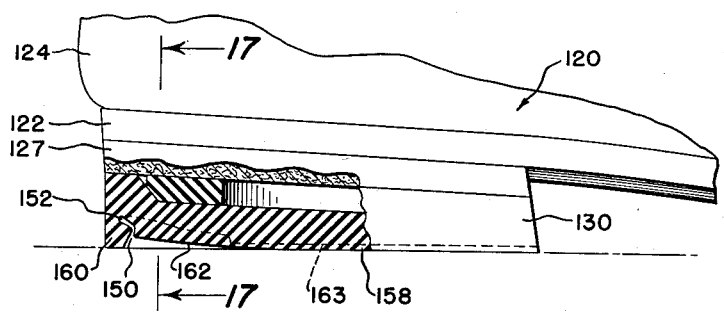
FIG. 16 is a fragmentary view of a shoe showing the improved heel attached thereto, part thereof being shown in section, the section being along line 15—15 of FIG. 13.
Figure 17:
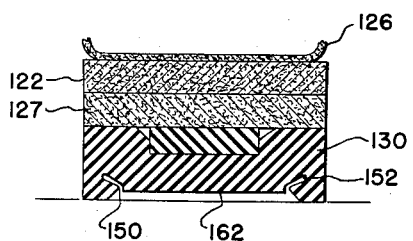
FIG. 17 is a sectional view taken along line 17—17 of FIG. 16.

The heel originally is formed as is shown in FIGS. 12, 14 and 15. However, when it is attached to the underside of the outsole, the skirt is forced downwardly as is shown in FIGS. 11, 16 and 17 whereby the bottom of the marginal edge of the skirt lies substantially in the same plane as the weight bearing portion 158. The skirt, therefore, functions as a shroud to conceal the sloping impact section and to conceal worn irregular portions of that section.

Figure 13:
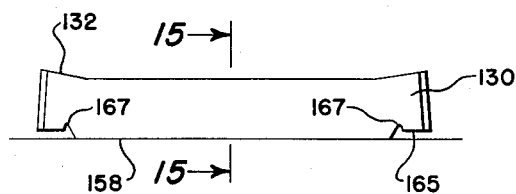
FIG. 13 is a front view of the heel shown in FIG. 12.

It will be observed more particularly from FIGS. 13 and 14 that the areas 165 along the underside of the forward portion of the heel are formed to simulate undercuts which extend inwardly from the margin so as to define the underside of the weight bearing portion 158. When the heel is attached to the shoe, the degree of incline of the undercut areas 165 is increased from horizontal, and this can be more readily seen by comparing FIG. 13 with FIG. 14, in which FIG. 13 shows the heel detached from the shoe, whereas FIG. 14 shows the heel attached to the shoe. These inclines gradually flatten to horizontal slightly forwardly of the forward ends of the groove 148. The inner ends of the undercut sections 165 terminate in a shallow groove 167 which provides for ready bending of the sides of the heel downwardly from the positions shown in FIG. 13 to those shown in FIG. 14.

The skirt-like portion 160 not only hides the worn crookedness of the heel but it also permits sloping of the impact section upwardly rearwardly without detection by the eye. Such sloping is highly desirable since the entire weight bearing portion of the heel is moved forwardly to the forward half of the heel i.e. to the desired underarch position relative to the foot of the wearer of the shoe. This assures positive lateral arch support across the breast of the heel. By undercutting the areas alongside of the weight bearing portion 158, as at 165, the marginal edge of the heel is not compressed. Such compressing which causes outwardly flaring at the bottom edge of the heel is not merely undesirable from appearance standpoint but also causes deteriorization along and rounding of the lower marginal edges of the shoe. The shape of the bottom sides of the heel remains substantially as shown in FIG. 16 since there is no wearing of the marginal sides of the heel.

It has also been found that inasmuch as the impact section 162 inclines upwardly rearwardly and inasmuch as the shroud collapses upon impact, the jar on the heel during walking is moved forwardly a material distance from normal with the result that the pounding which normally, permanently distorts the rear of the outsole, counter, and insole, is eliminated.

It has also been found that by forming the rear, approximate rear half portion of the heel as an impact section and forming the front, approximate front half portion of the heel as a weight bearing portion, the tendency to cause bending of the outsole, immediately forward of the heel, has been minimized, resulting in larger wear and less distortion of the outsole at the area below the arch of the foot of the wearer.

It will be observed that the entire area of weight bearing portion 158 lies parallel with the ground surface when the fore part of the sole rests upon the ground surface. Thus, in displaying a shoe equipped with the heel shown in FIGS. 11 to 17, undesirable rocking about the weight bearing surface is substantially eliminated i.e. in order to rock the rear of the shoe downwardly about the weight bearing portion, it is necessary to partly collapse the skirt-like portion 160.

Thus it is apparent that not only the style of the rear of the shoe is enhanced but also the style is retained throughout the normal life of the heel and also the features provide for and enhance the wearer's walking comfort.

While the forms of embodiment herein shown and described constitute preferred forms, it is to be understood that other forms may be adopted falling within the scope of the claims that follow.

I claim:

1. An article of manufacture comprising a heel for a shoe, said heel having:

(A) an upper horizontally extending section, through which section the entire heel is secured to a shoe;

(B) a forward weight bearing portion below said section;

(C) an arcuately shaped rear impact portion below said section;

(D) and an arcuately shaped downwardly extending, outwardly flexible and downwardly collapsible skirt-like portion, said skirt-like portion being formed of resilient material such as rubber and disposed outwardly of the impact portion throughout at least the margin of the rear and an immediate part of one side of said rear impact portion.

2. An article of manufacture as defined in claim 1, characterized in that the skirt-like portion is formed integrally with the impact portion.

3. An article of manufacture as defined in claim 1, characterized in that the skirt-like portion and the impact section are formed integrally with one another and further characterized to include webs connecting the skirt-like portion and the impact portion.

4. An article of manufacture as defined in claim 1, characterized in that the skirt-like portion is thicker at the bottom than at the top and in that the skirt-like portion extends inwardly and downwardly.

5. An article of manufacture as defined in claim 1, characterized in that a gap is formed between the upper, inner portion of the skirt and the impact section.

6. An article of manufacture comprising a heel for a shoe, said heel having a forward weight bearing section and an arcuately shaped rear impact section and being recessed from the bottom upwardly throughout portions disposed rearwardly of and at least one side of and immediately adjacent the impact section, said recess dividing the heel into a resilient portion, such as rubber, disposed rearwardly of and at said one side of the impact section capable of collapsing downwardly and flexing outwardly as the impact section moves forwardly relative to said portion when the wearer of the shoe is walking in a normal manner.

7. An article of manufacture comprising a heel for a shoe, said heel having a forward weight bearing section and an arcuately shaped rear impact section and being recessed from the bottom upwardly and then outwardly throughout portions disposed rearwardly of and at least one side and immediately adjacent the impact section, said recess dividing the heel into a resilient portion, such as rubber, disposed rearwardly of and at said one side of the impact section capable of collapsing downwardly and flexing outwardly as the impact section moves forwardly relative to said portion when the wearer of the shoe is walking in a normal manner.

8. An article of manufacture as defined in claim 1, characterized in that the impact section of the heel which lies immediately inwardly of the skirt-like portion is elevated above the lower edge of the skirt-like portion when the heel is attached to the shoe.

9. An article of manufacture as defined in claim 1, characterized in that the areas adjacent the opposite margins of the forward portion of the heel incline inwardly from the marginal edges when the heel is attached to the shoe whereby said weight bearing portion is removed from the marginal side edges at the front of the heel.

References Cited by the Examiner

UNITED STATES PATENTS

| | | | |
|---|---|---|---|
| 1,500,819 | 7/24 | Johnson et al. | 36—35 |
| 1,602,324 | 10/26 | Bigoney | 36—35 |
| 1,764,353 | 6/30 | Sansone | 36—35 |
| 2,394,281 | 2/46 | Williams | 36—35 X |
| 2,629,189 | 2/53 | Stein | 36—2.5 |
| 2,998,661 | 9/61 | Israel | 36—35 X |

JORDAN FRANKLIN, *Primary Examiner.*

DAVID J. WILLIAMOWSKY, FRANK J. COHEN,
*Examiners.*